United States Patent Office 3,005,813
Patented Oct. 24, 1961

3,005,813
METALLIFEROUS AZO-DYESTUFFS
Jakob Brassel, Basel, and Arthur Buehler, Rheinfelden, Switzerland, assignors to Ciba Limited, Basel, Switzerland
No Drawing. Filed May 20, 1954, Ser. No. 431,270
Claims priority, application Switzerland May 22, 1953
2 Claims. (Cl. 260—145)

This invention provides a process for the manufacture of valuable new metalliferous azo-dyestuffs, which contain one atom of metal in complex union with two molecules of different monoazo-dyestuffs, wherein a mixture of two different metallizable monoazo-dyestuffs, of which one contains a single free sulfonic acid group and the other is free from sulfonic acid and carboxylic acid groups, and at least one of which dyestuffs, advantageously the dyestuff free from sulfonic acid and carboxylic acid groups, contains a sulfonic acid aryl ester group or advantageously a sulfone group or a sulfonic acid amide group, is treated with an agent yielding cobalt or advantageously chromium under conditions such that the resulting metalliferous azo-dyestuff contains, per molecular proportion of monoazo-dyestuff, less than one, but at least one half, atomic proportion of cobalt or chromium bound in complex union.

The monoazo-dyestuffs containing a single sulfonic acid group, and used as starting materials in the present process, may be ortho - carboxy - ortho' - hydroxy-, ortho:ortho'-dihydroxy- or ortho - hydroxyortho'-amino-monoazo-dyestuffs. They can be obtained by coupling an ortho-carboxy- or an ortho-hydroxy-diazo compound, advantageously one of the benzene or naphthalene series, with a coupling component capable of coupling in ortho-position to a hydroxyl or amino group, the coupling component or advantageously the diazo-component containing a single sulfonic acid group.

As diazo-compounds there are advantageously used diazo compounds of those ortho-hydroxy-amines of the benzene or naphthalene series which, in addition to the hydroxyl and amino group, contain further substituents incapable of salt formation, such as nitro groups, halogen atoms (for example, chlorine), alkyl groups (for example, methyl), alkoxy groups (for example, $CH_3$—O—), acylamino groups, especially those containing only a few carbon atoms, that is to say, at most 4 carbon atoms (for example, acetylamino), or a sulfonic acid amide group which is advantageously substituted.

As examples there may be mentioned:

(a) Amines free from sulfonic acid groups 4- or 5-chloro-2-amino-1-hydroxybenzene,
4-, 5- or 6-nitro-2-amino-1-hydroxybenzene,
4:6-dichloro-2-amino-1-hydroxybenzene,
3:4:6-trichloro-2-amino-1-hydroxybenzene,
4-chloro-5- or -6-nitro-2-amino-1-hydroxy benzene,
4-nitro-6-chloro-2-amino-1-hydroxybenzene,
4-nitro-6-acetylamino-2-amino-1-hydroxybenzene,
6-nitro-4-acetylamino-2-amino-1-hydroxybenzene,
4:6-dinitro-2-amino-1-hydroxybenzene,
1-amino-2-hydroxynaphthalene,
2-amino-1-hydroxybenzene-4- or -5-sulfonic acid phenylamide,
4 - chloro - 2 - amino-1-hydroxybenzene-5-sulfonic acid phenyl- or N-ethyl-N-phenylamide,
2-amino-1-carboxylic acid, and especially (b) Amines containing one —$SO_3H$ group 2-amino-benzene-1-carboxylic acid-4- or -5-sulfonic acid,
2-amino-1-hydroxybenzene-4- or -5-sulfonic acid,
4-chloro or 4-methyl-2-amino-1-hydroxybenzene-5- or -6-sulfonic acid,
4-nitro-2-amino-1-hydroxybenzene-6-sulfonic acid,
6-nitro-2-amino-1-hydroxybenzene - 4 - sulfonic acid and above all naphthalene compounds, such as
2-amino-1-hydroxynaphthalene-4- or -8-sulfonic acid,
6-nitro-1-amino-2-hydroxynaphthalene-4-sulfonic acid,
6-bromo- or 6-methoxy-1-amino-2-hydroxynaphthalene-4-sulfonic acid and especially
1-amino-2-hydroxynaphthalene-4-sulfonic acid.

As coupling components there come into consideration those which are capable of coupling in a position vicinal to a primary or secondary amino group or a hydroxyl group, and among these there are also included keto-compounds which are capable of coupling in a position vicinal to their enolized or enolizable keto group.

As examples of suitable coupling components there may be mentioned:

(a) Coupling components free from sulfonic acid groups

Hydroxybenzenes, such as para-cresol or para-tertiary amylphenol, $\beta$-keto-carbaxylic acid esters or amides, such as aceto-acetic acid anilide and 1-acetoacetylamino-2-, -3- or -4-chlorobenzene; pyrazolones such as 1-phenyl-3-methyl-5-pyrazolone, 1-(2'-ethyl-phenyl) - 3 - methyl-5-pyrazolone, 1:3-diphenyl-5-pyrazolone, 1-(2'-, 3'- or 4'-chlorophenyl)-3-methyl-5-pyrazolone, 1-(2':5'-dichlorophenyl)-3-methyl-5-pyrazolone, 1-(2'-, 3'- or 4'-methyl phenyl)-3-methyl - 5 - pyrazolone, 1-[naphthyl-(1')- or -(2')]-3-methyl-5-pyrazolone, 1-phenyl - 5 - pyrazolone-3 - carboxylic acid phenylamide, 1-n-octyl-3-methyl-5-pyrazolone; hydroxyquinolines; barbituric acids; and especially naphthylamines or naphthols such as 6-bromo-, 6-methoxy- or 6-methyl-2-aminonaphthalene, 2-phenyl-aminonaphthalene, 2-aminonaphthalene itself and 2-aminonaphthalene-1-sulfonic acid which is known to couple to form the same dyestuffs as 2-aminonaphthalene accompanied by the splitting off of the —$SO_3H$ group in the 1-position, and also 6-bromo-, 6-methyl- or 6-methoxy-2-hydroxynaphthalene and especially 1-acetylamino-7-hydroxynaphthalene, 1-n-butyrylamino - 7 - hydroxy-naphthalene, 1-benzoylamino-7-hydroxynaphthalene, -1-carbethoxyamino - 7 - hydroxynaphthalene, 8-chloro-1-hydroxynaphthalene, 5-chloro-1-hydroxynaphthalene, 5:8-dichloro-1-hydroxynaphthalene, 4:8- or 5:8-dichloro-2-hydroxynaphthalene, 2-hydroxynaphthalene and, if desired, 1-hydroxynaphthalene. These compounds must be coupled only with diazo-compounds of the amines mentioned under (b) above.

(b) Coupling components containing one —$SO_3H$ group 1-phenyl-3-methyl-5-pyrazolone-2'-, -3'- or -4'-sulfonic acid,
2'-chloro - 1 - phenyl-3-methyl-5-pyrazolone-4'- or 5'-sulfonic acid,
2':5'-dichloro - 1 - phenyl-3-methyl-5-pyrazolone-4'-sulfonic acid,
1-[naphthyl-(1')] - 3 - methyl - 5 - pyrazolone-4'-, -5'-, -6'-, -7'- or -8'-sulfonic acid,
1-[naphthyl-(2')] - 3 - methyl - 5 - pyrazolone-2'-, or -8'-sulfonic acid,
1-acetoacetylaminobenzene-4-sulfonic acid and above all
2-amino- or 2-hydroxynaphthalene-4-, -5-, -6- or -7-sulfonic acid,
1-hydroxynaphthalene-4-, -5- or -8-sulfonic acid,
2-phenylaminonaphthalene-3'- or -4'-sulfonic acid.

These coupling components must be coupled only with diazo compounds of amines free from sulfonic acid groups as mentioned under (a) above.

The monoazo-dyestuffs free from sulfonic acid and carboxylic acid groups, which are also used as starting materials in the present process, can be made, for example, by coupling an ortho-hydroxy-diazo-compound of the benzene or naphthalene series with a compound capable of coupling in a position vicinal to an amino or hydroxyl group or an enolizable keto group, and the starting materials are advantageously so chosen that at least one of them contains a converted sulfonic acid group, that is to say, a sulfonic acid aryl ester group, and especially a sulfone group or a sulfonic acid amide group. Those dyestuffs which contain such a converted sulfonic acid group are used as starting materials only when the dyestuff containing a single free sulfonic acid group is free from sulfone groups and sulfonic acid amide groups.

As ortho-hydroxy-diazo-compounds for preparing the dyestuffs free from sulfonic acid and carboxylic acid groups there came into consideration, for example, those mentioned above under (a) in connection with the preparation of the monoazo-dyestuffs containing a sulfonic acid group. Especially valuable starting materials are obtained, however, with diazo-compounds of amines containing a sulfone group or a sulfonic acid amide group, such as 4-chloro- or 4-nitro-2-amino-1-hydroxybenzene-6-sulfonic acid amide, 6-nitro-2-amino-1-hydroxybenzene-4-sulfonic acid amide, 2-amino-1-hydroxybenzene-4- or -5-sulfonic acid methylamide, 2-amino-1-hydroxybenzene-4- or -5-sulfonic acid phenylamide, 2-amino-1-hydroxy-benzene-4- or -5-sulfonic acid dimethylamide, 4-chloro-2-amino - 1 - hydroxybenzene-5-sulfonic acid methylamide, ethylamide, isopropylamide or phenylamide, 4-chloro-2-amino-1-hydroxybenzene-5-sulfonic acid dimethyl amide, diethylamide or N-methyl-N-phenylamide, and the corresponding compounds which contain, instead of a sulfonic acid amide group, a methyl sulfone group, an ethyl sulfone group or especially a phenyl sulfone group, a para-methyl- or para-chloro-phenyl sulfone group.

As coupling components for preparing the monoazo-dyestuffs free from sulfonic acid and carboxylic acid groups there may be mentioned:

The coupling components free from sulfonic acid groups mentioned above, and also 1-phenyl-3-methyl-5-pyrazolone-3'-sulfonic acid amide, 1-phenyl-3-methyl-5-pyrazolone-3'-sulfonic acid methylamide, 2:4-dihydroxy-quinoline, 5-chloro-8-hydroxyquinoline, and 2 - amino-naphthalene-4-, -5- or -6-sulfonic acid amides, and amides or phenyl esters of 1-hydroxynaphthalene-4-, -5- or -8-sulfonic acid or of 2-hydroxynaphthalene-4-, -6- or -7-sulfonic acid.

For preparing both kinds of starting materials coupling of the diazo-compounds is carried out by methods in themselves known in an acid, neutral or alkaline medium. When amino-compounds are used as coupling components the coupling is advantageously carried out in an acid to neutral medium.

The mixture of the two dyestuffs to be metallized can be obtained, not only by mixing together the individual dyestuffs, but for example, by coupling 2 mols of one of the above mentioned ortho-hydroxy-diazo-compounds, which is free from sulfonic acid groups, with one mol each of two different coupling components of which one contains a sulfonic acid group and the other contains as a substituent a sulfone radical or a sulfonic acid amide radical. Furthermore, for example, 2 mols of a coupling component free from sulfonic acid groups may be coupled with 1 mol each of two different, advantageously selected, diazo-compounds. Especially valuable results are obtained with mixtures of the aforesaid monoazo-dyestuffs, which contain at least one mole of the monoazo-dyestuff free from sulfonic acid and carboxylic acid groups per mol of a monoazo-dyestuff containing one free sulfonic acid group.

As agents yielding metal there are used in the present process agents yielding cobalt, or more especially agents yielding chromium.

In carrying out the process it is generally of advantage to use a quantity of the agent yielding metal corresponding to about one atomic proportion of metal for each molecular proportion of the two different dyestuffs present in the mixture and/or to carry out the metallization in a weakly acid to alkaline medium. Accordingly, there are especially suitable for carrying out the process agents yielding metal which are stable in alkaline media, such, for example, as cobalt compounds of aliphatic hydroxy-carboxylic acids or dicarboxylic acids and advantageously chromium compounds of aromatic ortho-hydroxy-carboxylic acids, which contain the metal in complex union. As examples of aliphatic hydroxy-carboxylic acids there may be mentioned, inter alia, lactic acid, citric acid and especially tartaric acid, and as a dicarboxylic acid there may be mentioned oxalic acid, and among the aromatic hydroxy-carboxylic acids there may be mentioned those of the benzene series such as 4-, 5- or 6-methyl-1-hydroxy-benzene-2-carboxylic acid and above all 1-hydroxyben-zene-2-carboxylic acid itself. As agents yielding cobalt, however, it is of advantage to use simple cobalt salts, such as cobalt sulfate, or if desired, freshly precipitated cobalt hydroxide.

Conversion of the dyestuffs into their complex metal compounds is advantageously carried out at a raised temperature, under atmospheric or superatmospheric pressure for example at the boiling temperature of the reaction mixture, if desired, in the presence of a suitable addition, for example, salts of organic acids, bases, organic solvents or other agents assisting the formation of complexes. When an excess of the dyestuff containing a sulfonic acid group is used, it is possible by the subsequent addition of fresh quantities of the dyestuff free from sulfonic acid and carboxylic acid groups and, if desired, by the addition of the alkaline metallizing solution, to complete the metallization without forming appreciable quantities of the 1:1-complex of the dyestuff containing a sulfonic acid group.

The metal compounds obtainable by the process described above can also be obtained by a modification of that process, in which a metal-free monoazo-dyestuff and a metalliferous monazo-dyestuff, which contains about one atom of chromium or cobalt bound in complex union per molecule of dyestuff, are reacted together, and the two monoazo-dyestuffs are so chosen that one of them contains a free sulfonic acid group and the other contains no free sulfonic acid or carboxylic acid groups, and that at least one of these dyestuffs, advantageously the monoazo-dyestuff free from sulfonic acid and carboxylic acid groups, contains a sulfonic acid aryl ester group or especially a sulfone group or a sulfonic acid amide group.

The metal compounds of monoazo-dyestuffs used as starting materials in the latter form of the process, and which contain one atom of chromium or cobalt bound in complex union per molecule of dyestuff, are so-called 1:1-complexes which can be made by methods in themselves known, for example, by reacting the monoazo-dyestuff free from complex-forming metal, advantageously the dyestuff which contains a sulfonic acid group, in an acid medium with an excess of a salt of the said metal, for example, a cobalt salt or advantageously a salt of trivalent chromium, such as chromium sulfate or chromium fluoride at the boiling temperature or, if desired, at a temperature exceeding 100° C. When, instead of the ortho:ortho'-dihydroxy- or ortho-hydroxy-ortho'-amino-monoazo-dyestuffs of the kind defined above there are used the corresponding ortho-alkoxy-ortho'-hydroxy- or ortho-alkoxy-ortho'-amino-monoazo-dyestuffs, the latter are subjected to a de-alkylating metallization, and there are obtained the same 1:1-complexes used as starting materials in the modified process. In order to convert the metal-free dyestuffs free from sulfonic acid groups into the 1:1-complexes it is generally of advantage to carry out the metallization in the presence of an organic solvent, for example, alcohol.

The reaction of the 1:1-metal complexes so obtained with the metal-free dyestuffs is advantageously carried out in an aqueous neutral to weakly alkaline medium at the ordinary temperature or a raised temperature. It is generally desirable to react together approximately equivalent quantities of the metalliferous 1:1-complex and the metal-free dyestuff.

The new products obtainable by the processes described above are metal compounds which contain one atom of chromium or cobalt bound in complex union with two molecules of different monoazo-dyestuffs, of which one contains a single free sulfonic acid group and the other contains no free sulfonic acid or carboxylic acid groups, and of which at least one, advantageously the dyestuff free from sulfonic acid and carboxylic acid groups, contains a sulfonic acid aryl ester group or more especially a sulfone group or sulfonic acid amide group.

Mixtures of such metalliferous mixed complexes can be obtained by the processes described above by reacting an agent yielding metal of the aforesaid kind simultaneously with two or more dyestuff mixtures of the kind defined above or by reacting a metalliferous 1:1-complex simultaneously with two or more metal-free-dyestuffs or two or more metalliferous 1:1-complexes with a metal-free dyestuff in suitable relative proportions. Especially valuable are those mixtures of mixed complexes in which the number of mols of the dyestuff containing a sulfonic acid group is at most equal to that of the dyestuff free from sulfonic acid and carboxylic acid groups.

The new metalliferous mixed complexes obtainable by the process of this invention are soluble in water. They are suitable for dyeing or printing a very wide variety of materials, but especially for dyeing animal materials such as silk, leather and especially wool (including loose wool), and also for dyeing or printing synthetic fibers of superpolyamides, superpolyurethanes or polyacrylonitrile. They are especially suitable for dyeing from weakly alkaline, neutral or weakly acid baths, advantageously acetic acid baths. The dyeings so produced are level and possess a good fastness to light, washing, fulling, decatizing and carbonizing.

The following examples illustrate the invention, the percentages being by weight, and "1 mol" means, as is usual, the molecular weight of the substance in grams but the quantities given may of course be increased, for example, to 10 or 1000 times the values given. When the dyestuffs used as starting materials are not in a pure form, for example, in the form of closely defined dyestuff acids or dyestuff salts, but contain, for example, as the result of being precipitated by salting out, foreign substances which have substantially no adverse effect on the reaction, such dyestuffs can normally be used in that form with good success. However, it is then necessary to determine the content of pure dyestuff by any known method, for example, by titration of the azo groups:

EXAMPLE 1

0.01 mol of the dyestuff from diazotized 1-amino-2-hydroxynaphthalene-4-sulfonic acid and 2-hydroxynaphthalene is boiled under reflux for one hour with 0.01 mol of the dyestuff from diazotized 4-chloro-2-amino-1-hydroxybenzene-5-sulfonic acid methylamide and 2-hydroxynaphthalene in 400 cc. of water with the addition of 2 cc. of a 10 N-solution of sodium hydroxide and 30 grams of a solution of sodium chromosalicylate having a chromium content of 2.6 percent. If required, the mixture is filtered to remove a small amount of impurities. The chromium complex so formed is precipitated from its solution by the addition of 60 grams of sodium chloride, filtered off and dried. The resulting water-soluble chromiferous dyestuff dyes wool from neutral to acetic acid baths level blue tints which are fast to washing, fulling and light.

EXAMPLE 2

0.01 mol of the dyestuff from diazotized 1-amino-2-hydroxynaphthalene-4-sulfonic acid and 8-chloro-1-hydroxynaphthalene is boiled under reflux for one hour with 0.01 mol of the dyestuff from diazotized 2-amino-1-hydroxybenzene-5-sulfonic acid amide and 5:8-dichloro-1-hydroxynaphthalene in 400 cc. of water with the addition of 2 cc. of a 10 N-solution of sodium hydroxide and 30 grams of a solution of sodium chromosalicylate having a chromium content of 2.6 percent. If required, the mixture is filtered to remove a small amount of impurities. The chromium complex so formed is precipitated from its solution by the addition of 80 grams of sodium chloride and 9 cc. of 2 N-acetic acid, filtered off and dried. The chromiferous dyestuff so obtained dyes wool from neutral or acetic acid baths level blue tints which are fast to washing, fulling and light.

EXAMPLE 3

0.009 mol of the dyestuff from diazotized 1-amino-2-hydroxynaphthalene-4-sulfonic acid and 5:8-dichloro-1-hydroxynaphthalene are boiled under reflux for one hour with 0.01 mol of the dyestuff from diazotized 2-amino-1-hydroxybenzene-5-sulfonic acid amide and 5:8-dichloro-1-hydroxynaphthalene in 400 cc. of water with the addition of 2 cc. of a 2 N-solution of sodium hydroxide and 30 grams of a solution of sodium chromosalicylate having a chromium content of 2.6 percent. If required, the mixture is filtered to remove a small amount of impurities. The chromiferous dyestuff so obtained is precipitated from solution by the addition of 90 grams of sodium chloride and 8 cc. of 2 N-acetic acid, filtered off and dried. It dyes wool from neutral or acetic acid baths level blue tints which are fast to washing, fulling and light.

By using, instead of 0.009 mol of the dyestuff from diazotized 1-amino-2-hydroxynaphthalene-4-sulfonic acid and 5:8-dichloro-1-hydroxynaphthalene, 0.011 mol of the dyestuff from diazotized 1-amino-2-hydroxynaphthalene-4-sulfonic acid and 1-hydroxynaphthalene there is obtained a dyestuff having similar properties.

EXAMPLE 4

0.01 mol of the dyestuff from diazotized 2-amino-1-hydroxynaphthalene-8-sulfonic acid and 5:8-dichloro-1-hydroxynaphthalene is boiled under reflux for 3 hours with 0.01 mol of the dyestuff from diazotized 2-amino-1-hydroxybenzene-4-sulfonic acid amide and 5:8-dichloro-1-hydroxynaphthalene in 400 cc. of water with the addition of 2 cc. of a 10 N-solution of sodium hydroxide and 30 grams of a solution of sodium chromosalicylate having a chromium content of 2.6 percent. The reaction mixture is allowed to cool and filtered to remove a small amount of impurities. The chromium complex so formed is precipitated from solution by the addition of 50 grams of sodium chloride and 4 cc. of 2 N-acetic acid, filtered off and dried. It dyes wool from neutral or acetic acid baths level blue tints which are fast to washing, fulling and light.

EXAMPLE 5

0.01 mol of the dyestuff from diazotized 4-nitro-2-amino-1-hydroxybenzene-6-sulfonic acid and 6-methoxy-2-hydroxynaphthalene is boiled under reflux for one hour with 0.01 mol of the dyestuff from diazotized 2-amino-1-hydroxybenzene-5-sulfonic acid amide and 5:8-dichloro-1-hydroxynaphthalene in 400 cc. of water with the addition of 10 cc. of a 2 N-solution of sodium hydroxide and 30 grams of a solution of sodium chromosalicylate having a chromium content of 2.6 percent. If required, the mixture is filtered to remove a small amount of impurities. The chromium complex so formed is precipitated from solution by the addition of 110 grams of sodium chloride and 12 cc. of 2 N-acetic acid, filtered off and dried. It dyes wool from neutral or acetic acid baths level blue-grey tints which are fast to washing, fulling and light.

A similar chromium compound is obtained by using, instead of the 6-methoxy-2-hydroxynaphthalene, an equivalent quantity of 5:8-dichloro-1-hydroxynaphthalene.

EXAMPLE 6

0.006 mol of the dyestuff from diazotized 1-amino-2-hydroxynaphthalene-4-sulfonic acid and 2-hydroxynaphthalene are boiled under reflux for one hour with 0.004 mol of the dyestuff from diazotized 1-amino-2-hydroxynaphthalene-4-sulfonic acid and 5:8-dichloro-1-hydroxynaphthalene and with 0.01 mol of the dyestuff from diazotized 4-chloro-2-amino-1-hydroxybenzene - 5 - sulfonic acid methylamide and 2-hydroxynaphthalene in 400 cc. of water with the addition of 2 cc. of a 10 N-solution of sodium hydroxide and 30 grams of a solution of sodium chromosalicylate having a chromium content of 2.6 percent. If required, the mixture is filtered to remove a small amount of impurities. The chromiferous dyestuff is precipitated from solution by the addition of 60 grams of sodium chloride, filtered off and dried. It dyes wool from neutral or acetic acid baths level blue tints which are fast to washing, fulling and light.

EXAMPLE 7

0.009 mol of the dyestuff from diazotized 1-amino-2-hydroxynaphthalene-4-sulfonic acid and 5:8-dichloro-1-hydroxynaphthalene are boiled under reflux for one hour with 0.005 mol of the dyestuff from diazotized 2-amino-1-hydroxybenzene-4-sulfonic acid methylamide and 2-hydroxynaphthalene and with 0.005 mol of the dyestuff from diazotized 4 - chloro - 2 - amino - 1 - hydroxybenzene-5-sulfonic acid methylamide and 2-hydroxynaphthalene in 400 cc. of water with the addition of 2 cc. of a 10 N-solution of sodium hydroxide and 30 grams of a solution of sodium chromosalicylate having a chromium content of 2.6 percent. If required, the mixture is filtered to remove a small amount of impurities. The resulting chromiferous dyestuff is precipitated from solution by the addition of 60 grams of sodium chloride, filtered off and dried. It dyes wool from neutral or acetic acid baths level blue tints which are fast to washing, fulling and light.

EXAMPLE 8

0.01 mol of the dyestuff from nitrated 1-diazo-2-hydroxynaphthalene-4-sulfonic acid and 2-hydroxynaphthalene is boiled under reflux for 2 hours with 0.01 mol of the dyestuff from diazotized 2-amino-1-hydroxybenzene-4-sulfonic acid methylamine and 2-hydroxynaphthalene in 400 cc. of water with the addition of 10 cc. of a 2 N-solution of sodium hydroxide and 30 grams of a solution of sodium chromosalicylate having a chromium content of 2.6 percent. If required, the mixture is filtered to remove a small amount of impurities. The chromiferous dyestuff is precipitated from solution by the addition of 80 grams of sodium chloride, filtered off and dried. It dyes wool from neutral or acetic acid baths level violet-brown tints which are fast to washing, fulling and light.

EXAMPLE 9

0.01 mol of the complex chromium compound (containing one molecule of dyestuff bound in complex union with one atom of chromium) of the dyestuff from diazotized 1-amino-2-hydroxynaphthalene-4-sulfonic acid and 2-hydroxynaphthalene is boiled under reflux for 30 minutes with 0.01 mol of the dyestuff from diazotized 4-chloro-2-amino-1-hydroxybenzene-5-sulfonic acid methylamide and 2-hydroxynaphthalene in 400 cc. of water with the addition of 2 cc. of a 10 N-solution of sodium hydroxide. If required, the mixture is filtered to remove a small mount of impurities. The chromium complex so formed is precipitated from solution by the addition of 60 grams of sodium chloride, filtered off and dried. The resulting water-soluble chromiferous dyestuff possesses the same dyeing properties as the dyestuff of Example 1.

By using, instead of the complex chromium compound and metal-free dyestuff mentioned in this example, those given in columns I and II, respectively, of the following table, there are obtained mixed chromium complexes which dye wool from weakly acid baths the tints given in column III:

| | I<br>1:1-complex chromium compound | II<br>chromium-free dyestuff | III<br>tint |
|---|---|---|---|
| 1 | 4-nitro-2-amino-phenol-6-sulfonic acid→1-phenyl-3-methyl-5-pyrazolone. | 2-amino-phenol-4-phenyl-sulfone→acetoacetic acid anilide. | orange. |
| 2 | 1-amino-2-hydroxy-6-nitro-naphthalene-4-sulfonic acid→β-naphthol. | 2-aminophenol-4-methyl-sulfone→1-carbo-methoxy-amino-7-hydroxy-naphthalene. | grey. |
| 3 | 4-nitro-2-amino-phenol-6-sulfonic acid→1-phenyl-3-methyl-5-pyrazolone. | 4-chloro-2-amino-phenol→2-hydroxy-naphthalene-6-sulfonic acid phenyl ester. | red brown. |
| 4 | 2-aminobenzoic acid→1-phenyl-3-methyl-5-pyrazolone-4'-sulfonic acid. | 2-aminophenol-4-sulfamide→5:8-dichloro-1-naphthol. | grey. |
| 5 | ---do--- | 2-aminophenol-5-sulfamide→5:8-dichloro-1-naphthol. | do. |
| 6 | ---do--- | 4-nitro-2-amino-phenol-6-sulfamide→4-tert. amyl-1-hydroxybenzene. | beige. |
| 7 | 5-nitro-2-amino-phenol→2-naphthylamino-6-sulfonic acid. | 2-amino-1-hydroxy-benzene-4-sulfonic acid isopropylamide→acetoacetic acid anilide. | yellowish olive. |

EXAMPLE 10

0.01 mol of the dyestuff from diazotized 5-nitro-2-amino-1-hydroxybenzene and 2-aminonaphthalene-6-sulfonic acid is heated at 75° C. with 0.01 mol of the dyestuff from diazotized 2-amino-1-hydroxybenzene-4-sulfonic acid isopropylamide and acetoacetic acid anilide in 400 cc. of water with the addition of 12 cc. of a 2 N-solution of sodium hydroxide. After the addition of a solution of 0.011 mol of cobalt acetate in 50 cc. of water, the reaction mixture is heated to 75° C. and then stirred for one hour at 75–80° C. If required, the mixture is filtered to remove a small amount of impurities. The cobalt complex so formed is precipitated from solution by the addition of 70 grams of sodium chloride, filtered off and dried. The dyestuff so obtained dyes wool from neutral baths green tints which are fast to washing, fulling and light.

EXAMPLE 11

2 parts of the chromiferous dyestuff obtained as described in Example 1 are dissolved in 4000 parts of water, and 100 parts of well wetted wool are entered at 40–50° C. into the resulting dyebath. 2 parts of acetic acid of 40 percent strength are then added, the bath is raised to the boil in the course of ½ hour and dyeing is continued at the boil for ¾ hour. Finally, the wool is rinsed with cold water and dried. The wool is dyed a navy blue tint of good fastness to light and washing.

A navy blue dyeing is likewise obtained when no acetic acid is added to the dyebath, or when, instead of wool, superpolyamide fibers (nylon fibers) are dyed in the manner described above.

What is claimed is:

1. A complex chromium compound containing one atom of chromium in complex union with two molecules of two different ortho:ortho'-dihydroxy monoazo-dyestuffs of which one corresponds to the formula

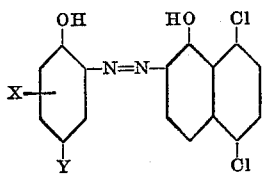

wherein X represents a sulfonic acid amide group and Y represents a member of the group consisting of a chlorine and a hydrogen atom while the other monoazo-dyestuff corresponds to the formula

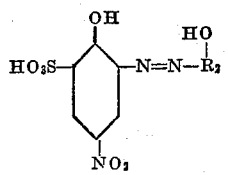

wherein $R_2$ represents a member of the group consisting of a 1-hydroxy-5:8-dichloronaphthalene radical bound in 2-position to the azo linkage and a 6-methoxy-2-hydroxynaphthalene radical bound in 1-position to the azo linkage.

2. The complex chromium compound containing one atom of chromium bound in complex union with the monoazo dyestuffs of the formulae

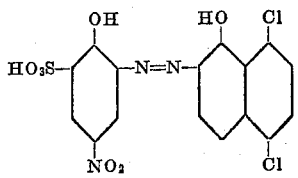

and

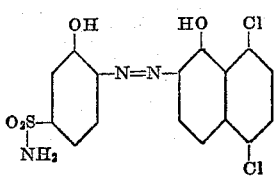

References Cited in the file of this patent
UNITED STATES PATENTS

| | | |
|---|---|---|
| 1,984,096 | Straub et al. | Dec. 11, 1934 |
| 2,012,779 | Straub et al. | Aug. 27, 1935 |
| 2,353,675 | Knecht et al. | July 18, 1944 |
| 2,674,515 | Widner et al. | Apr. 6, 1954 |
| 2,749,332 | Buehler et al. | June 5, 1956 |